US008694507B2

(12) United States Patent
Meyerzon et al.

(10) Patent No.: US 8,694,507 B2
(45) Date of Patent: Apr. 8, 2014

(54) TENANTIZATION OF SEARCH RESULT RANKING

(75) Inventors: Dmitriy Meyerzon, Bellevue, WA (US); Mihai Petriuc, Redmond, WA (US); Nicolai Bodd, Stabekk (NO)

(73) Assignee: Microsoft Corporation, Redmond, WA (US)

( * ) Notice: Subject to any disclaimer, the term of this patent is extended or adjusted under 35 U.S.C. 154(b) by 245 days.

(21) Appl. No.: 13/287,656

(22) Filed: Nov. 2, 2011

(65) Prior Publication Data
US 2013/0110828 A1 May 2, 2013

(51) Int. Cl.
G06F 7/00 (2006.01)
G06F 17/30 (2006.01)

(52) U.S. Cl.
USPC ..... 707/741; 707/711; 707/728; 707/999.003

(58) Field of Classification Search
None
See application file for complete search history.

(56) References Cited

U.S. PATENT DOCUMENTS

| 7,249,058 | B2 | 7/2007 | Kim et al. | |
|---|---|---|---|---|
| 7,657,555 | B2 | 2/2010 | Rorex et al. | |
| 7,840,569 | B2 | 11/2010 | Meyerzon et al. | |
| 8,301,612 | B2 * | 10/2012 | Barker et al. | 707/705 |
| 8,312,047 | B2 * | 11/2012 | Barker et al. | 707/790 |
| 2007/0130137 | A1 | 6/2007 | Oliver et al. | |
| 2008/0082504 | A1 * | 4/2008 | Jasik et al. | 707/3 |
| 2008/0306939 | A1 | 12/2008 | Bhattacharjee et al. | |
| 2009/0063471 | A1 | 3/2009 | Erickson | |
| 2009/0106235 | A1 | 4/2009 | Tankovich et al. | |
| 2009/0276405 | A1 * | 11/2009 | Weissman et al. | 707/3 |
| 2009/0327266 | A1 | 12/2009 | Tankovich et al. | |
| 2013/0179450 | A1 * | 7/2013 | Chitiveli | 707/737 |

OTHER PUBLICATIONS

Long, Xiaohui et al., "Three-Level Caching for Efficient Query Processing in Large Web Search Engines", In Proceedings of the 14th International Conference on World Wide Web, May 10-14, 2005, 10 pages.

* cited by examiner

*Primary Examiner* — Azam Cheema
(74) *Attorney, Agent, or Firm* — Merchant & Gould P.C.

(57) ABSTRACT

This disclosure describes methods and systems for searching documents in a multi-tenant hosting environment. According to embodiments, to conserve hardware resources, a plurality of documents associated with a plurality of tenants may be mapped to the same search index in the multi-tenant hosting environment. In order to search documents associated only with a single tenant in the multi-tenant hosting environment, a tenant identifier is prepended to every key stored in the search index that is associated with the plurality of documents of the single tenant. Moreover, where one document links to another document within the multi-tenant hosting environment, the link is stored in a web graph when a source tenant identifier matches a target tenant identifier for the link. According to embodiments, when conducting a search, the link is resolved only if the link is stored in the web graph.

20 Claims, 10 Drawing Sheets

TENANTIZATION OF SEARCH RESULT RANKING

INTRODUCTION

The use of search engines to locate relevant documents within a database, enterprise intranet, or the Internet has become commonplace. At a very high level, most search engines function by performing three distinct steps: identifying all documents that match the search criteria (the "candidate documents"); ranking the candidate documents based on a predicted relevance; and presenting the results to the user beginning with the most relevant.

The quality of the relevance ranking function may be very important to a user's satisfaction with the search engine because the user is not expected to, and in many cases cannot realistically, review the entire set of matching documents. In most cases, the user reviews only a relatively small number of those documents and so the most relevant candidates within that small subset should be presented first for the search (or query) to be successful.

The quality of the relevance ranking function is dependent on two characteristics: the set of features on which the ranking is based; and the specific algorithm applied to the features. The ranking features are attributes of the candidate documents that contribute to predicting relevance of the document. Ranking features may depend on corpus-wide statistics, such as document frequency and average length of the document, as well as linking information between the documents in the corpus (or, document collection). The ranking algorithm defines how the ranking features are combined together to rank order the candidate documents. The ranking algorithm may also have parameters that may be trained to maximize an expected relevance measure of the search engine.

In some cases, in order to take advantage of the economies of scale, different entities (or tenants) may employ the same hosting environment. That is, different entities may employ a common computer software or hardware environment. Accordingly, searches done across all documents in the shared hosting environment may include documents belonging to multiple tenants of the hosting environment. It is with respect to this general environment that embodiments of the present application are directed.

SUMMARY

This disclosure describes methods and systems for searching documents in a multi-tenant hosting environment. According to embodiments, to conserve hardware resources, a plurality of documents associated with a plurality of tenants may be mapped to the same search index in the multi-tenant hosting environment. In order to search documents associated only with a single tenant in the multi-tenant hosting environment, a tenant identifier is prepended to every key stored in the search index that is associated with the plurality of documents of the single tenant. Moreover, where one document links to another document within the multi-tenant hosting environment, a web graph is provided in which a link is stored only if a target tenant identifier for the link matches a source tenant identifier for the link. According to embodiments, when conducting a search, the link is resolved only if the link is stored in the web graph.

According to embodiments, a computer storage medium storing computer-executable instructions for implementing a method of indexing a first document in a multi-tenant hosting environment is provided. The method comprises indexing a first property of a first document in a search index. Indexing the first property comprises identifying a first plurality of keys in the first property of the first document. Indexing the first property further comprises prepending a first tenant identifier to each key of the first plurality of keys to form a first plurality of first tenant identifier-key combinations and storing the first plurality of first tenant identifier-key combinations in a search index. Indexing the first property further comprises mapping the first property of the first document to each of the first plurality of first tenant identifier-key combinations in the search index.

According to further embodiments, a computer system is provided for performing a method of searching a plurality of documents associated with a tenant in a multi-tenant hosting environment. The method comprises receiving a search key from a tenant in a multi-tenant hosting environment, wherein the search key is prepended to a tenant identifier associated with the tenant to form a tenant identifier-search key combination. The method further comprises querying a search index for a tenant identifier-key combination that corresponds with the tenant identifier-search key combination and returning one or more documents mapped to the corresponding tenant identifier-key combination, wherein the one or more documents are associated with the tenant in a multi-tenant hosting environment.

According to further embodiments, a computer-implemented method is provided for searching a plurality of documents associated with a tenant in a multi-tenant hosting environment. The computer-implemented method comprises receiving a search key from a tenant in a multi-tenant hosting environment, wherein the search key is prepended to a tenant identifier associated with the tenant to form a tenant identifier-search key combination. The method further comprises querying a search index for a tenant identifier-key combination that corresponds with the tenant identifier-search key combination and returning one or more documents mapped to the corresponding tenant identifier-key combination, wherein the one or more documents are associated with the tenant in a multi-tenant hosting environment.

These and various other features as well as advantages which characterize the systems and methods described herein will be apparent from a reading of the following detailed description and a review of the associated drawings. Additional features are set forth in the description that follows, and in part will be apparent from the description, or may be learned by practice of the technology. The benefits and features of the technology will be realized and attained by the structure particularly pointed out in the written description and claims herein as well as the appended drawings.

It is to be understood that both the foregoing general description and the following detailed description are exemplary and explanatory and are intended to provide further explanation for the appended claims.

DETAILED DESCRIPTION

Figure 1:
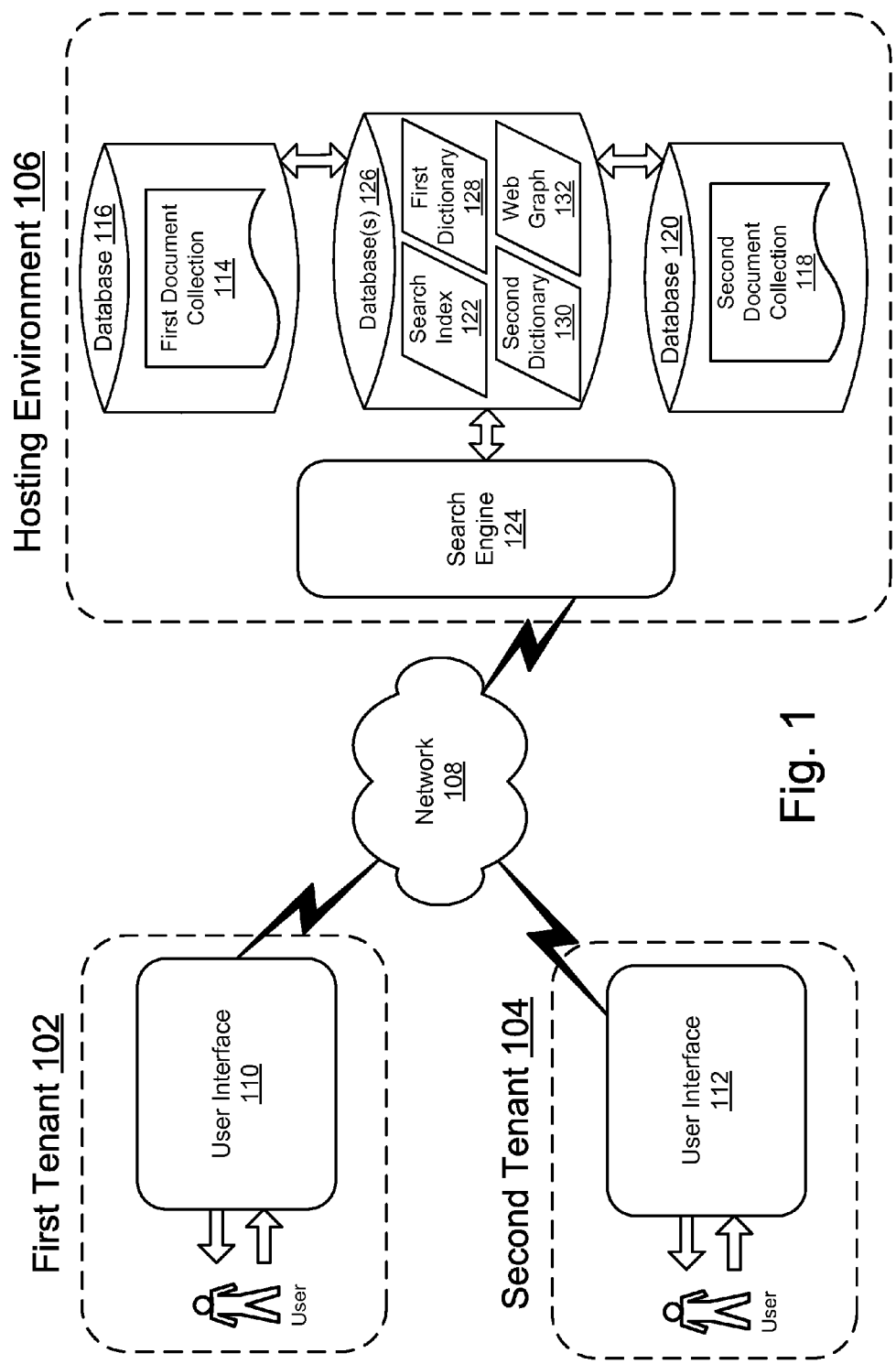
FIG. 1 is an illustration of an embodiment of a multi-tenant hosting environment.

This detailed description is made with reference to the accompanying drawings, which form a part hereof, and which show, by way of illustration, specific embodiments. These embodiments are described in sufficient detail to enable those skilled in the art to practice what is taught below, and it is to be understood that other embodiments may be utilized and that logical, mechanical, electrical, and other changes may be made without departing from the spirit or scope of the subject matter. The following detailed description is, therefore, not to be taken in a limiting sense, and its scope is defined only by the appended claims.

This disclosure describes methods and systems for searching documents in a multi-tenant hosting environment. A multi-tenant hosting environment allows different entities (e.g., tenants) to take advantage of the economies of scale by using a common software and hardware computing environment. According to an embodiment, a multi-tenant hosting environment may comprise an environment wherein common hardware or software is operated under the control of one entity (i.e., host) on behalf of one or more other entities (i.e., tenants). According to further embodiments, to conserve hardware resources, a plurality of documents associated with a plurality of tenants may be mapped to the same search index in the multi-tenant hosting environment. In order to search documents associated only with a single tenant in the multi-tenant hosting environment, a tenant identifier is prepended to every key stored in the search index that is associated with the plurality of documents of the single tenant. Moreover, where one document links to another document within the multi-tenant hosting environment, a web graph is provided in which a source tenant identifier and a target tenant identifier are associated with the link. In embodiments, when conducting a search, the link is resolved only if the source tenant identifier matches the target tenant identifier for the link.

More specifically, to facilitate searching documents within the multi-tenant hosting domain, each of the documents may be mapped to keys (K) in a search index, e.g., using an inverted index data structure. For purposes of this disclosure, a multi-tenant hosting environment may comprise a search domain, which refers to all documents, collections of documents, and the search index or other databases that are within the scope of a search engine. According to embodiments, more than one search index may be within the scope of the search engine, although it is beneficial to map as many documents as possible to a common search index in order to conserve hardware resources. For purposes of this disclosure, a key (K) refers to anything that is searchable within a document, e.g., words, phrases, numbers, symbols, etc., and a document refers to any logical subset of data, e.g., textual, numerical, symbolic, or other data. Each document may further include a number of properties, e.g., body, title, headings, cells, table of contents, metadata, anchor text, etc. According to embodiments, each property of a document may be mapped to keys within the search index.

Thereafter, documents may be searched based on one or more search keys (SK). Similar to keys, search keys refer to anything that is searchable within a document, e.g., words, phrases, numbers, symbols, etc. However, search keys dictate the documents to be retrieved in a search. Thus, upon receiving the search key "airplane," a search engine may return all documents mapped to a key "airplane" in a search index. A search may also be limited in scope. For example, a user may be interested only in documents that contain the one or more search keys in one or more document properties. Thus, for the search key "airplane," a search engine may identify only documents in the search domain for which one or more properties, e.g., title property, body property, metadata property, etc., are mapped to the key "airplane" in the search index.

The initial set of documents (i.e., candidate documents) returned by the search engine may be quite large. Indeed, some of the candidate documents may be more relevant than others. As such, after identifying the candidate documents, the search engine may proceed to rank the candidate documents by a predicted relevancy. For example, the search engine may apply a ranking function, or algorithm, to one or more characteristics, or ranking features, of the candidate documents to obtain a score for each document. Ranking features may include static features, e.g., related to the type, date, or length of the document, or dynamic features, e.g., related to any TF/IDF features, or based on term frequencies, tf, or document frequencies, n. Term frequency refers to the number of times a term occurs in a document (or in a particular property of the document). Document frequency refers to the number of documents that the term occurs in the entire collection. Typically, a ranking function will promote documents with higher term frequency, but terms with higher document frequency (i.e., popular terms) will be weighted lower than the rare terms. As such, in a multi-tenant hosting environment, document frequency should be computed with respect to the possible recall set of documents, i.e., a postings list of documents associated with a single key for a single tenant. The candidate documents are then ordered by their score in decreasing order of predicted relevance.

Upon ranking the candidate documents, the ranked documents are then displayed starting with the most relevant. Typically, the ranked documents are presented in relatively small groups, such as 10 or 20 at a time. As it is likely that a user may only review a small number of these groups, the most relevant documents are generally presented first. Furthermore, in a multi-tenant hosting environment, it is important that the most relevant documents to a particular tenant are presented first.

FIG. 1 is an illustration of an embodiment of a multi-tenant hosting environment.

According to embodiments of the present disclosure, the methods disclosed herein may be implemented in a multi-tenant hosting environment, e.g., offered with Microsoft® Office 365 cloud-computing packages. A multi-tenant hosting environment may involve a first tenant, e.g., tenant 102, and a second tenant, e.g., tenant 104. Tenant 102 and tenant 104 may be persons, small businesses, non-profit organizations, corporations, or any other logical entity. Moreover, tenant 102 and tenant 104 may be competing entities, e.g., entities within the same industry, technology area, research or development area, retail space, etc. In order to take advantage of the economies of scale, tenants 102 and 104 may further utilize a multi-tenant hosting environment, e.g., hosting environment 106. Tenants 102 and 104 may access the hosting environment 106 via a network 108, e.g., an intranet, an extranet, a cloud computing network, etc. For example, tenant 102 may access the hosting environment via a user interface 110 that it connected to network 108 and tenant 104 may access the hosting environment via a user interface 112 that it connected to network 108.

A multi-tenant hosting environment allows different entities (e.g., tenants 102 and 104) to take advantage of the economies of scale by using a common software and hardware computing environment. That is, the different entities may use common hardware, e.g., memory and processors, and common software, e.g., computer-readable instructions or data structures, for storing and accessing data. For example, document collections from different entities may be stored within the multi-tenant hosting environment. For purposes of this disclosure, a "collection of documents" or a "document collection" refers to a group of documents associated with a single entity or tenant within a multi-tenant hosting environment. For example, first document collection 114 may be stored in database 116 on the hosting environment 106 and second document collection 118 may be stored in database 120 on the hosting environment 106 (shown). According to alternative embodiments, first document collection 114 and second document collection 118 may be stored in the same database on the hosting environment 106 (not shown). According to alternative embodiments, first document collection 114 may be stored in a database associated with tenant 102 and second document collection 118 may be stored in a database associated with tenant 104 (not shown). In this case, first document collection 114 and second document collection 118 may be accessible to the hosting environment 106 for searching.

According to further embodiments, other data and information regarding tenants, e.g., tenants 102 and 104, may be stored in dictionaries, web graphs, or other suitable data stores on the hosting environment 106. For example, data and information regarding tenants, e.g., tenants 102 and 104, may be stored in one or more common databases, e.g., database(s) 126 (shown). Alternatively, data and information regarding tenants, e.g., tenants 102 and 104, may be stored in dedicated databases for each tenant (not shown). According to some embodiments, a ranking function such as the BM25F ranking function may be used to rank documents on a degree of textual match with a query. In this case, other data and information (e.g., N, $AVDL_p$, etc.) regarding first tenant 102 may be stored in a dedicated dictionary (e.g., first dictionary 128) or may be stored in a common dictionary with data and information regarding other tenants (not shown). According to some embodiments, other data and information (e.g., N, $AVDL_p$, etc.) regarding second tenant 104 may be stored in a dedicated dictionary (e.g., second dictionary 130) or may be stored in a common dictionary with data and information regarding other tenants (not shown). According to embodiments, dedicated dictionaries (e.g., first dictionary 128 and second dictionary 130) may be stored in one or more common databases (e.g., database(s) 126) (shown) or may be stored in dedicated databases for each tenant (not shown).

According to some embodiments, cross-document linking information regarding documents associated with the first tenant 102 and the second tenant 104 may be stored in a common web graph, e.g., web graph 132 (shown). According to other embodiments, cross-document linking information regarding documents associated with the first tenant 102 may be stored in a dedicated web graph (not shown). Similarly, according to embodiments, cross-document linking information regarding documents associated with the second tenant 104 may be stored in a dedicated web graph (not shown). According to embodiments, dedicated or common web graphs may be stored in one or more common databases (e.g., database(s) 126) (shown), or may be stored in dedicated databases for each tenant (not shown). According to embodiments, in order to conserve hardware resources, any common or dedicated database may be stored in any suitable dedicated memory, shared memory, partitioned memory, or otherwise, on the hosting environment 106.

Moreover, in a multi-tenant hosting environment, document collections from different entities may be mapped to a common search index. For example, first document collection 114 and second document collection 118 may both be mapped to search index 122. According to embodiments, search index 122 may be stored in one or more databases with other data and information associated with the multi-tenant hosting environment, e.g., database(s) 126 (shown). Alternatively, search index 122 may be stored in a dedicated database comprising only search index 122 (not shown). According to embodiments, a plurality of document collections may be keyed to the same search index in order for tenants to take advantage of the economies of scale. That is, hardware resources may be conserved by keying the plurality of document collections to the same search index (e.g., a common search index) rather than keying each document collection to a separate search index (e.g., a dedicated search index). As a result of the conservation of hardware resources, tenants may be able to enjoy substantial monetary savings, among other benefits.

Furthermore, a common search engine within a multi-tenant hosting environment may be used to query a plurality of document collections from different entities. For example, search engine 124 within the hosting environment 106 may use the search index 122 to query the first document collection 114 and the second document collection 118. However, the search engine may only return results from one of the first document collection 114 or the second document collection 118 based on a tenant identifier associated with the search key. The search engine 124 may comprise any suitable computing system, as described with reference to FIG. 2. For example, the search engine 124 may comprise various computing modules, sub-modules, components, etc., for searching and calculating a predicted relevancy for documents in a plurality of document collections. Indeed, functional steps, operations, methods, etc., as described herein may be conducted by any suitable combination of hardware and software on search engine 124.

Although the economies of scale offer many benefits to tenants of a multi-tenant hosting environment, some issues may arise with regard to document searching. That is, ideally a query conducted by a tenant should appear to the tenant as if it were conducted on a dedicated search index. However, when a query is conducted for a particular tenant over all document collections (i.e., over the whole search domain), the predicted relevancy calculation may not adequately take into consideration features specific to the tenant's document collection. For example, the average document length (AVDL) or the total document count (N) of the tenant's document collection may be different than the AVDL or the N for the whole search domain, skewing the predicted relevancy calculation for documents within the tenant's document collection. Furthermore, if tenants are competing entities it is possible that one entity could "spam" another entity. For example, documents (or documents containing links referencing other documents) may be added to the search domain to alter the inverted document frequency (IDF) of one or more search keys (or to alter other ranking features), skewing the predicted relevancy calculation. Additionally, if searching is allowed over all document collections within a multi-tenant hosting environment, significant processing is required to filter out the documents associated with other tenants. Even so, information leakage may occur between different entities if searching is allowed over all document collections within a multi-tenant hosting environment.

As may be appreciated, the disclosed aspects of a multi-tenant hosting environment are not to be understood as an exclusive array, as any number of similar suitable components may be employed within the spirit of the present disclosure. Further, the disclosed aspects are not to be understood as a necessary array, as any number of the disclosed components may be appropriately replaced by other suitable components without departing from the spirit of the present disclosure. The illustrated embodiments of a multi-tenant hosting environment are provided for purposes of example only.

Figure 2:
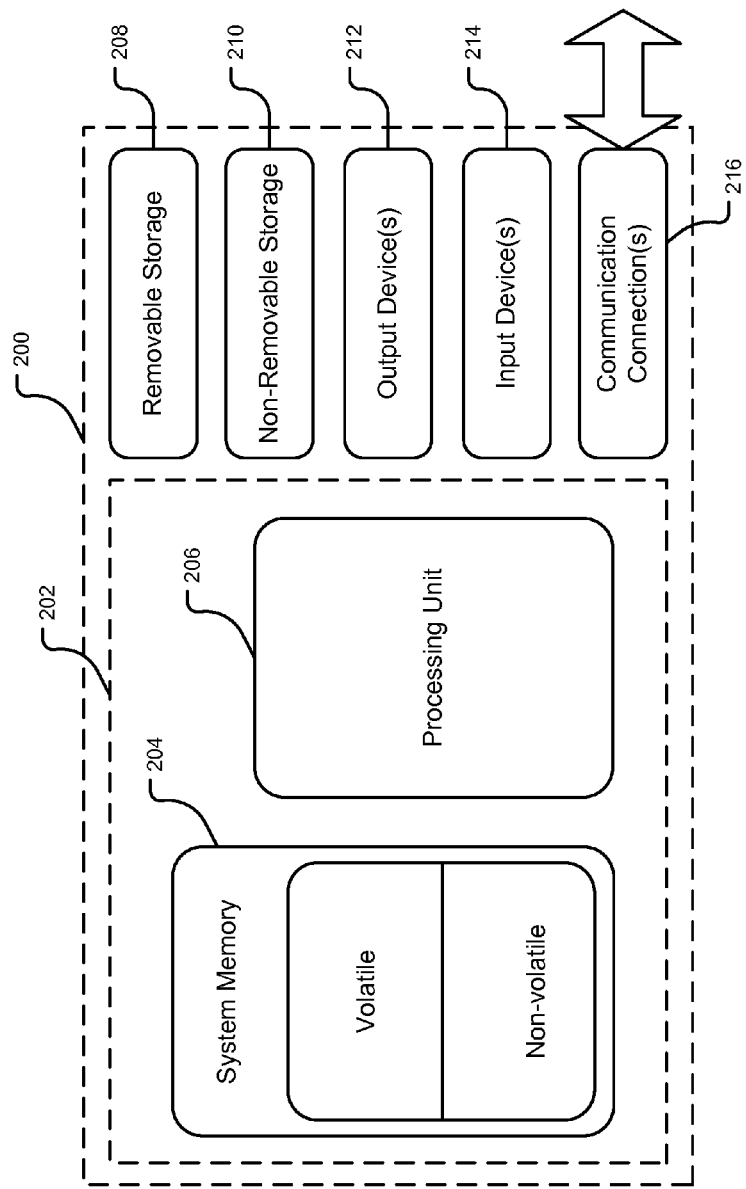
FIG. 2 is a block diagram illustrating an embodiment of a suitable computer system for implementing one or more aspects of search result ranking.

FIG. 2 is a block diagram illustrating an embodiment of a suitable computer system for implementing one or more aspects of the management of a GUI.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIG. 2 and the associated description provide a discussion of a variety of operating environments in which embodiments may be practiced. However, the devices and systems described herein and illustrated and described with respect to FIG. 2 are for purposes of example and illustration and are not limiting of a vast number of computing device configurations that may be utilized for practicing embodiments described herein.

FIG. 2 illustrates an example computer system 200 upon which embodiments disclosed herein may be implemented. Computer system 200, such as search engine 124 as shown in FIG. 1, for example, has at least one processor 206 for searching documents within a search domain, e.g., first document collection 114 and the second document collection 118 as shown in FIG. 1. Computer system 200 has system memory 204 comprising, for example, volatile memory and non-volatile memory. For example, hosting environment 106 may comprise system memory 204 that stores the first document collection 114, the second document collection 118, database(s) 126, etc. In its most basic configuration, computer system 200 is illustrated in FIG. 2 by dashed line 202. According to embodiments, computer system 200 may include additional storage (removable or non-removable) including, but not limited to, magnetic or optical disks or tape. Such additional storage is illustrated in FIG. 2 by removable storage 208 and non-removable storage 210.

The term computer readable media as used herein may include computer storage media. Computer storage media may include volatile and nonvolatile, removable and non-removable media implemented in any method or technology for storage of information, such as computer readable instructions, data structures, program modules, or other data. System memory 204, removable storage 208, and non-removable storage 210 are all computer storage media examples (i.e., memory storage). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computer system 200. Any such computer storage media may be part of computer system 200. Computer system 200 may also have input device(s) 214 such as a keyboard, a mouse, a pen, a sound input device, a touch input device, etc. Output device(s) 212 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Computer system 200 may also contain communications connection(s) 216 that allow the device to communicate with other devices, e.g., via network 108. For example, first tenant 102 and second tenant 104 may communicate via communication connection(s) 216 with search engine 124 in order to query the first document collection 114 or the second document collection 118.

Embodiments of the invention may be practiced via a system-on-a-chip (SOC) where each or many of the components illustrated in FIG. 2 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to providing continuous access to a resource, may operate via application-specific logic integrated with other components of the computer system 200 on the single integrated circuit (chip).

Figure 3A:
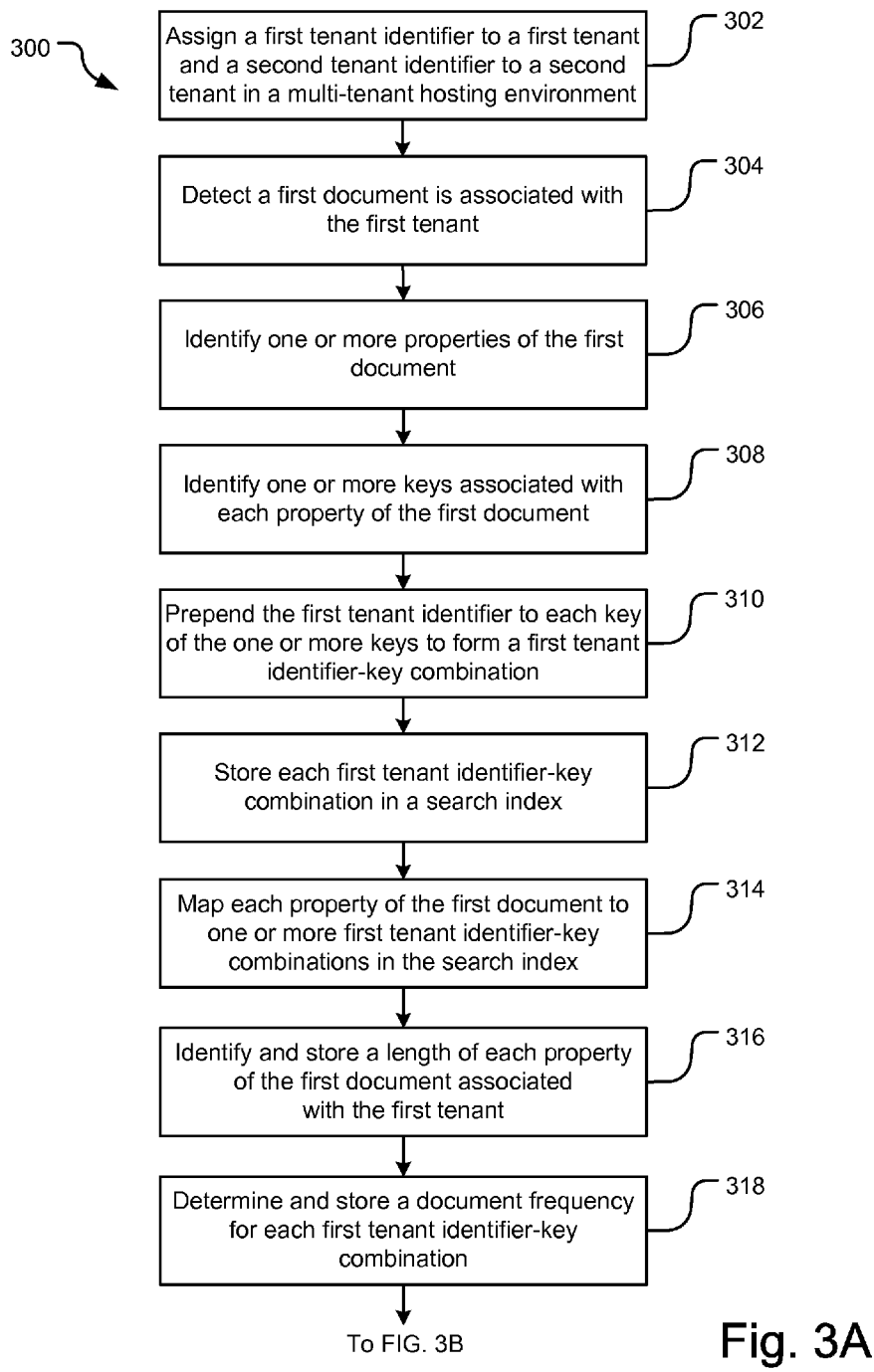
FIGS. 3A and 3B are flow diagrams representing an embodiment of a method for indexing a first document associated with a first tenant and a second document associated with a second tenant in a multi-tenant hosting environment.
Figure 3B:
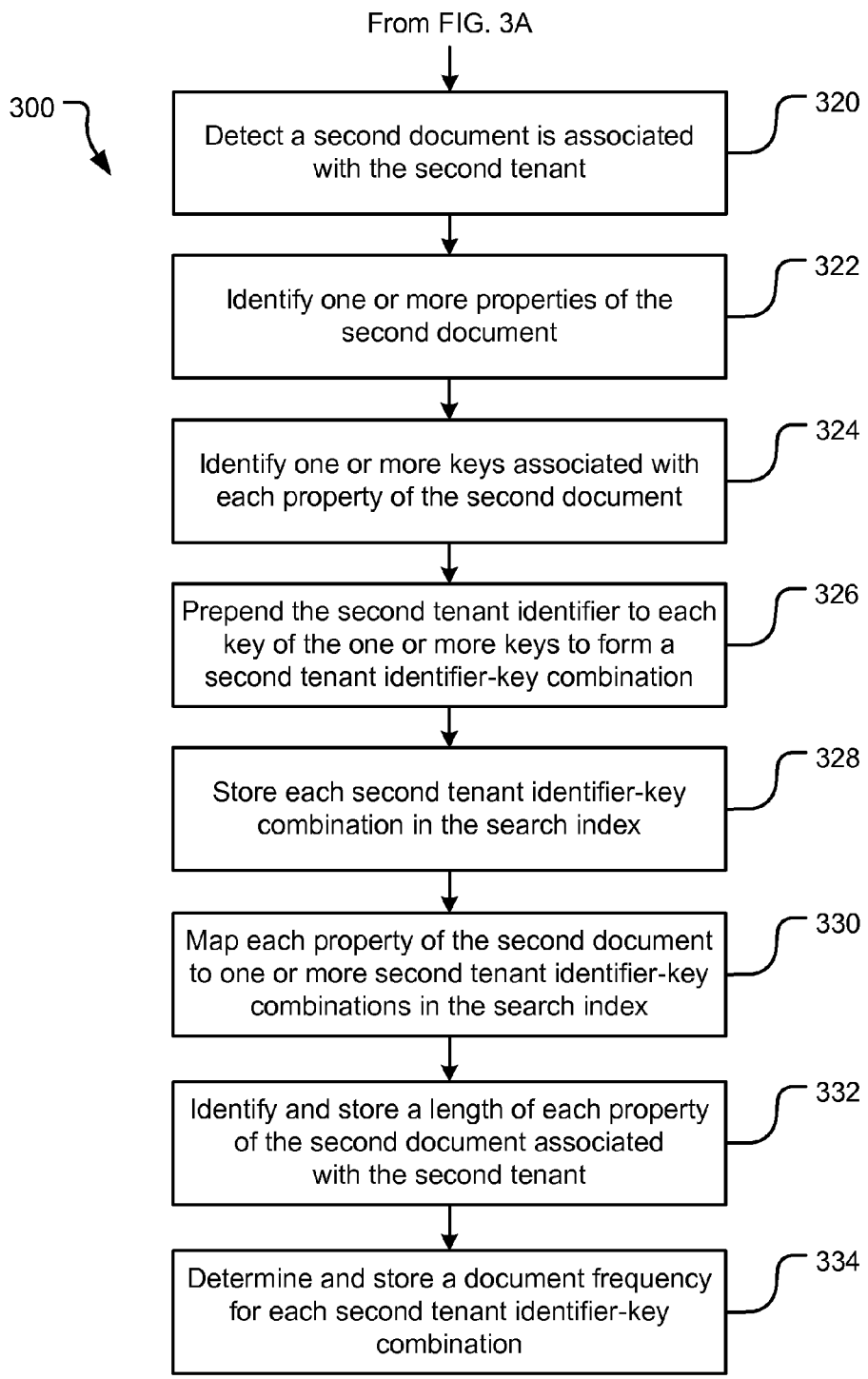

FIGS. 3A and 3B are flow diagrams representing an embodiment of a method for indexing a first document associated with a first tenant and a second document associated with a second tenant in a multi-tenant hosting environment.

According to some embodiments, some or all of the method 300 of FIGS. 3A and 3B may be implemented on a computer system, e.g., computer system 200. Further, some or all of the method 300 of FIGS. 3A and 3B may be performed within a multi-tenant hosting environment, e.g., hosting environment 106.

The method 300 of FIG. 3A begins with assign operation 302. At assign operation 302, a first tenant identifier ($TID_1$) is assigned to a first tenant and a second tenant identifier ($TID_2$) is assigned to a second tenant in a multi-tenant hosting environment. The first tenant identifier and the second tenant identifier may be any suitable identifier, e.g., a unique numeric constant used to denote the first tenant and a unique numeric constant used to denote the second tenant.

At detect operation 304, it is detected that a first document of a plurality of documents is associated with the first tenant. For example, a computer system associated with a multi-tenant hosting environment may detect that the first document is associated with the first tenant via any suitable means. According to embodiments, a computer system associated with a multi-tenant hosting environment may associate the first document with the first tenant when the first document is stored in a database on the hosting environment. According to alternative embodiments, a computer system associated with a multi-tenant hosting environment may access the first document in a database on the first tenant, thereby detecting that the first document is associated with the first tenant.

At identify properties operation 306, one or more properties of the first document are identified. The one or more properties of the first document may be identified via any suitable means, e.g., by a document crawler. Properties of documents include body, title, headings, cells, table of contents, metadata, anchor text, etc. According to embodiments, each document of the plurality of documents associated with the first tenant may have one or more of the same properties. That is, one document may have a first property of title and a second property of body and another document may have a first property of title, a second property of body, and a third property of metadata. As such, the first property of one document may be compared to the first property over the plurality of documents, e.g., a length of the first property in one document may be compared to an average length of the first property over the plurality of documents.

At identify keys operation 308, one or more keys associated with each of the one or more properties of the first document are identified. The one or more keys may be identified via any suitable means, e.g., by a document crawler. A key (K) refers to anything that is searchable within a document, e.g., words, phrases, numbers, symbols, etc. As such, the computer system may identify a key "airplane" in a first property of the first document (e.g., a title property) and may also identify the key "airplane" in a second property of the first document (e.g., a body property). Alternatively, the computer system may identify a key "soar" in the second property of the first document (e.g., a body property) but not in the first property of the first document (e.g., a title property).

At prepend operation 310, the first tenant identifier is prepended to each of the one or more keys associated with each of the one or more properties of the first document. For example, a computer system associated with a multi-tenant hosting environment may prepend the first tenant identifier to each of the one or more keys via any suitable means. As specified above, in this embodiment, the first document is associated with the first tenant. As such, each key identified in the first document is prepended with the first tenant identifier assigned to the first tenant. According to embodiments, by prepending each key (K) of the one or more keys (n) with the first tenant identifier ($TID_1$), one or more first tenant identifier-key combinations are formed, e.g., $TID_1\text{-}K_n$.

At store operation 312, each of first tenant identifier-key combinations ($TID_1\text{-}K_n$ is stored in a search index, e.g., an inverted search index. For example, a computer system associated with a multi-tenant hosting environment may store the first tenant identifier-key combinations in the search index via any suitable means. In this way, tenant identifier-key combinations of one tenant may be distinguished from tenant identifier-key combinations of other tenants in a multi-tenant hosting environment based on the prepended tenant identifier.

At map operation 314, each of the one or more properties of the first document is mapped to one or more of the first tenant identifier-key combinations in a search index. For example, a computer system associated with a multi-tenant hosting environment may map the one or more properties to the first tenant identifier-key combinations in the search index via any suitable means. For example, the search index may comprise an inverted index in which each of the one or more first tenant identifier-key combinations is mapped to one or more properties of a plurality of documents associated with the first tenant. In this way, keys mapped to documents of one tenant may be distinguished from keys mapped to the documents of other tenants (i.e., mapped to second tenant identifier-key combinations) in a multi-tenant hosting environment. Thus, document collections from a plurality of tenants may be mapped to the same search index, e.g., search index 122.

At identify operation 316, a length of each property in the first document ($D_1L_p$) is identified and stored. According to embodiments, the length of each property of the first document may be detected via any suitable means, e.g., word count. Moreover, each property of the first document may have a different length. For example, a title property may have a different length from a body property. According to embodiments, the length of each property in the first document may be identified by a computer system on the hosting environment when the first document is stored in a database or indexed on the hosting environment. According to alternative embodiments, the computer system associated with a multi-tenant hosting environment may access the length of each property in the first document in a database of the first tenant. Upon identifying the length of each property in the first document, the length of each property ($D_1L_p$) may be stored on the hosting environment in a dictionary associated with the first tenant (e.g., first dictionary 128) or other dictionary or database. Alternatively, upon identifying the length of each property in the first document, the length of each property ($D_1L_p$) may be stored in a database of the first tenant.

At determine operation 318, a document frequency (n) for each of the one or more first tenant identifier-key combinations is determined For example, a computer system on the hosting environment may determine a document frequency, n, for each first tenant identifier-key combination associated with the first tenant, i.e., $TID_1\text{-}K_n$. This determination may be based on the length of a postings list in the inverted index associated with $TID_1\text{-}K_n$. According to embodiments, determination of the document frequency does not require any additional computation to filter out statistics for other tenants in the multi-tenant hosting environment. According to additional embodiments, a computer system associated with a multi-tenant hosting environment may store the document frequency for each first tenant identifier-key combination in the search index via any suitable means. In this way, the document frequency associated with each tenant identifier-key combination of the first tenant may be distinguished from the document frequency for each tenant identifier-key combination of other tenants in a multi-tenant hosting environment.

The method 300 of FIG. 3B, which is a continuation of the method 300 of FIG. 3A, begins with detect operation 320. At detect operation 320, it is detected that a second document of a plurality of documents is associated with the second tenant. For example, a computer system associated with a multi-tenant hosting environment may detect that the second document is associated with the second tenant via any suitable means. According to embodiments, a computer system associated with a multi-tenant hosting environment may associate the second document with the second tenant when the second document is stored in a database on the hosting environment. That is, the first document associated with the first tenant and the second document associated with the second tenant may both be stored within the hosting environment. According to alternative embodiments, a computer system associated with a multi-tenant hosting environment may access the second document in a database on the second tenant, thereby detecting that the second document is associated with the second tenant.

At identify properties operation 322, one or more properties of the second document are identified. The one or more properties of the second document may be identified via any suitable means, e.g., by a document crawler. According to embodiments, the second document may have one or more of the same types of properties as the first document, e.g., a first property of title and a second property of body. Even so, it is undesirable that the properties of a document associated with one tenant be compared with the properties of a document associated with another tenant.

At identify keys operation 324, one or more keys associated with each of the one or more properties of the second document are identified. As with identify keys operation 308, the one or more keys may be identified via any suitable means, e.g., by a document crawler.

At prepend operation 326, the second tenant identifier is prepended to each of the one or more keys associated with each of the one or more properties of the second document. For example, a computer system associated with a multi-tenant hosting environment may prepend the second tenant identifier to each of the one or more keys via any suitable means. As specified above, in this embodiment, the second document is associated with the second tenant. As such, each key identified in the second document is prepended with the second tenant identifier assigned to the second tenant. According to embodiments, by prepending each key (K) of the one or more keys (n) with the second tenant identifier ($TID_2$), one or more first tenant identifier-key combinations are formed, e.g., $TID_2$-$K_n$. In this way, keys identified in the second document associated with the second tenant are distinguishable from keys identified in the first document associated with the first tenant.

At store operation 328, each of second tenant identifier-key combinations ($TID_2$-$K_n$) is stored in the search index, e.g., an inverted search index. For example, a computer system associated with a multi-tenant hosting environment may store the second tenant identifier-key combinations in the search index via any suitable means. In this way, tenant identifier-key combinations of one tenant may be distinguished from tenant identifier-key combinations of other tenants in a multi-tenant hosting environment based on the prepended tenant identifier.

At map operation 330, each of the one or more properties of the second document is mapped to one or more of the second tenant identifier-key combinations in the search index. For example, a computer system associated with a multi-tenant hosting environment may map the one or more properties to the second tenant identifier-key combinations in the search index via any suitable means. For example, the search index may comprise an inverted index in which each of the one or more second tenant identifier-key combinations is mapped to one or more properties of a plurality of documents associated with the second tenant. Moreover, the search index may further comprise the one or more first tenant identifier-key combinations mapped to one or more properties of a plurality of documents associated with the first tenant. Thus, document collections from a plurality of tenants may be mapped to the same search index, e.g., search index 122.

At identify operation 332, a length of each property in the second document ($D_2L_p$) is identified and stored. According to embodiments, the length of each property of the second document may be detected via any suitable means, e.g., character count, word count, page count, etc. Moreover, each property of the second document may have a different length. For example, a title property may have a different length from a body property, etc. According to embodiments, the length of each property in the second document may be identified by a computer system on the hosting environment when the second document is stored in a database or indexed on the hosting environment. According to alternative embodiments, the computer system associated with a multi-tenant hosting environment may access the length of each property in the second document in a database of the second tenant. Upon identifying the length of each property in the second document, the length of each property ($D_2L_p$) may be stored on the hosting environment in a dictionary associated with the second tenant (e.g., second dictionary 130) or other dictionary or database. Alternatively, upon identifying the length of each property in the second document, the length of each property ($D_1L_p$) may be stored in a database of the second tenant.

At determine operation 334, a document frequency (n) for each of the one or more second tenant identifier-key combinations may be determined For example, a computer system on the hosting environment may determine a document frequency, n, for each second tenant identifier-key combination associated with the second tenant, i.e., $TID_2$-$K_n$. This determination may be based on the length of a postings list in the inverted index associated with $TID_2$-$K_n$. According to embodiments, determination of the document frequency does not require any additional computation to filter out statistics for other tenants in the multi-tenant hosting environment. Moreover, a computer system associated with a multi-tenant hosting environment may store the document frequency for each second tenant identifier-key combination in the search index via any suitable means. In this way, the document frequency associated with each tenant identifier-key combination of the second tenant may be distinguished from the document frequency for each tenant identifier-key combination of other tenants in a multi-tenant hosting environment.

As should be appreciated, the particular steps and methods described herein are not exclusive and, as will be understood by those skilled in the art, the particular ordering of steps as described herein is not intended to limit the method, e.g., steps may be performed in differing order, additional steps may be performed, and disclosed steps may be excluded without departing from the spirit of the present disclosure.

Figure 4:
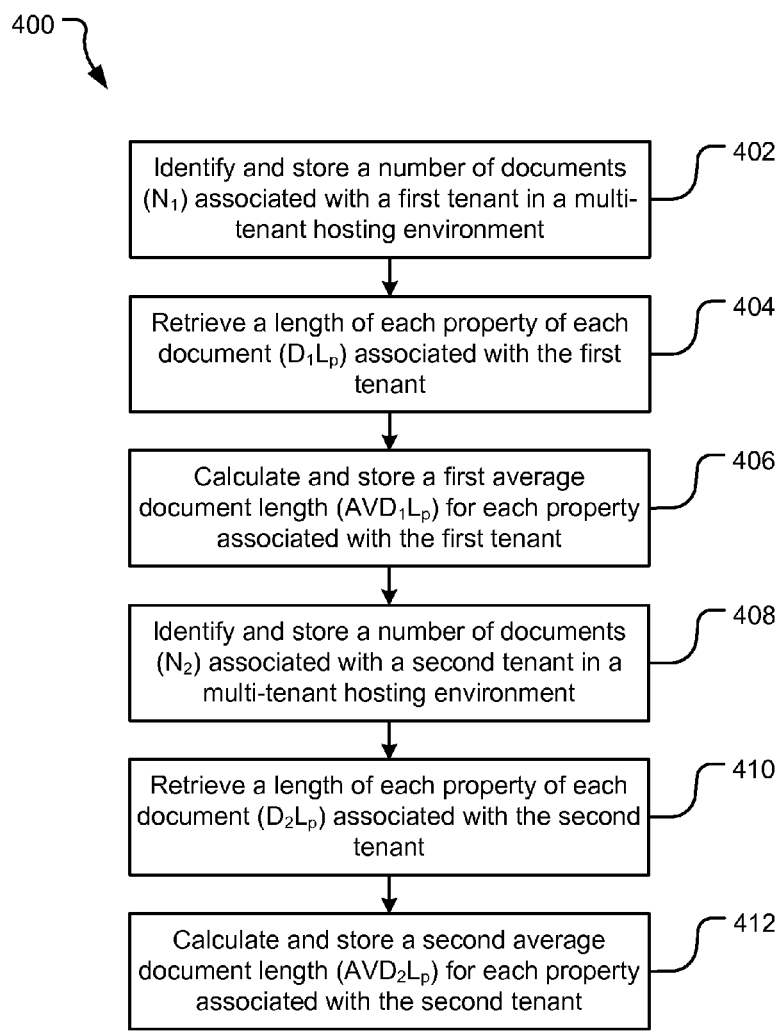
FIG. 4 is a flow diagram representing an embodiment of a method for calculating and storing an average document length for each property ($AVDL_p$) associated with a tenant in a multi-tenant hosting environment.

FIG. 4 is a flow diagram representing an embodiment of a method for calculating and storing an average document length for each property ($AVDL_p$) associated with a tenant in a multi-tenant hosting environment.

According to some embodiments, some or all of the method of FIG. 4 may be implemented on a computer system, e.g., computer system 200. Further, some or all of the method of FIG. 4 may be performed within a multi-tenant hosting environment, e.g., hosting environment 106. Further still, some or all of the method of FIG. 4 may be performed in conjunction with or in addition to the method of FIGS. 3A and 3B.

At identify operation 402, a plurality of documents associated with a first tenant in a multi-tenant hosting environment are identified. Moreover, a first total document count ($N_1$) in the plurality of documents associated with the first tenant is identified. For example, the first total document count ($N_1$) may be identified by a computer system on the hosting environment when the plurality of documents associated with the first tenant are stored in a database or indexed on the hosting environment. The computer system may further store $N_1$ in a dictionary (e.g., first dictionary 128) or other database on the multi-tenant hosting environment, e.g., hosting environment 106. According to alternative embodiments, the computer system may access the first total document count ($N_1$) in a dictionary or other database of the first tenant.

At retrieve operation 404, a length of each property of each document associated with the first tenant in a multi-tenant hosting environment is retrieved. According to embodiments, the length of each property may be retrieved via any suitable means. For example, the document length for a first property ($D_1L_p$) associated with a first document may be retrieved from a dictionary associated with the first tenant (e.g., first dictionary 128) or other database on the hosting environment. According to alternative embodiments, the computer system associated with a multi-tenant hosting environment may retrieve $D_1L_p$ in a dictionary or other database of the first tenant.

At calculate operation 406, an average document length for each property associated with the first tenant ($AVD_1L_p$) in a multi-tenant hosting environment is calculated and stored. According to embodiments, a computer system on the hosting environment may calculate the $AVD_1L_p$ for each property associated with the first tenant via any suitable means. For example, upon retrieving a document length for a first property of a plurality of documents associated with the first tenant, the average document length for the first property may be calculated by taking the total document length of the first property divided by the number of documents associated with the first tenant that have the first property. Upon calculating the $AVD_1L_p$ for each property associated with the first tenant, the $AVD_1L_p$ may be stored on the hosting environment in a dictionary associated with the first tenant (e.g., first dictionary 128) or other database. Alternatively, upon calculating the $AVD_1L_p$ for each property associated with the first tenant, the $AVD_1L_p$ for each property may be stored in a database of the first tenant.

At identify operation 408, a plurality of documents associated with the second tenant in a multi-tenant hosting environment are identified. Moreover, a second total document count ($N_2$) in the plurality of documents associated with the second tenant is identified. According to embodiments, the second total document count ($N_2$) may be identified via any suitable means. For example, the second total document count ($N_2$) may be identified by the computer system on the hosting environment when the plurality of documents associated with the second tenant are stored in a database or indexed on the hosting environment. The computer system may further store $N_2$ in a dictionary (e.g., second dictionary 130) or other database on the multi-tenant hosting environment, e.g., hosting environment 106. According to alternative embodiments, the computer system may access the second total document count ($N_2$) in a dictionary or other database of the second tenant.

At retrieve operation 410, a length of each property of each document associated with the second tenant in a multi-tenant hosting environment is retrieved. According to embodiments, a computer system on the hosting environment may retrieve the length of each property via any suitable means. For example, the document length for a first property associated with a second document ($D_2L_p$) may be retrieved from a dictionary associated with the second tenant (e.g., second dictionary 130) or other database on the hosting environment. According to alternative embodiments, the computer system associated with a multi-tenant hosting environment may retrieve $D_2L_p$ in a dictionary or other database of the second tenant.

At calculate operation 412, an average document length for each property associated with the second tenant ($AVD_2L_p$) in a multi-tenant hosting environment is calculated and stored. According to embodiments, a computer system on the hosting environment may calculate the $AVD_2L_p$ for each property associated with the second tenant via any suitable means. For example, upon retrieving a document length for a first property of a plurality of documents associated with the second tenant, the average document length for the first property may be calculated by taking the total document length of the first property divided by the number of documents associated with the second tenant that have the first property. Upon calculating the $AVD_2L_p$ for each property associated with the second tenant, the $AVD_2L_p$ may be stored on the hosting environment in a dictionary associated with the second tenant (e.g., second dictionary 130) or other database. That is, the $AVD_1L_p$ associated with the first tenant and the $AVD_2L_p$ associated with the second tenant may both be stored on the multi-tenant hosting environment. Alternatively, upon calculating the $AVD_2L_p$ for each property associated with the second tenant, the $AVD_2L_p$ for each property may be stored in a database of the second tenant.

As should be appreciated, the particular steps and methods described herein are not exclusive and, as will be understood by those skilled in the art, the particular ordering of steps as described herein is not intended to limit the method, e.g., steps may be performed in differing order, additional steps may be performed, and disclosed steps may be excluded without departing from the spirit of the present disclosure.

Figure 5:
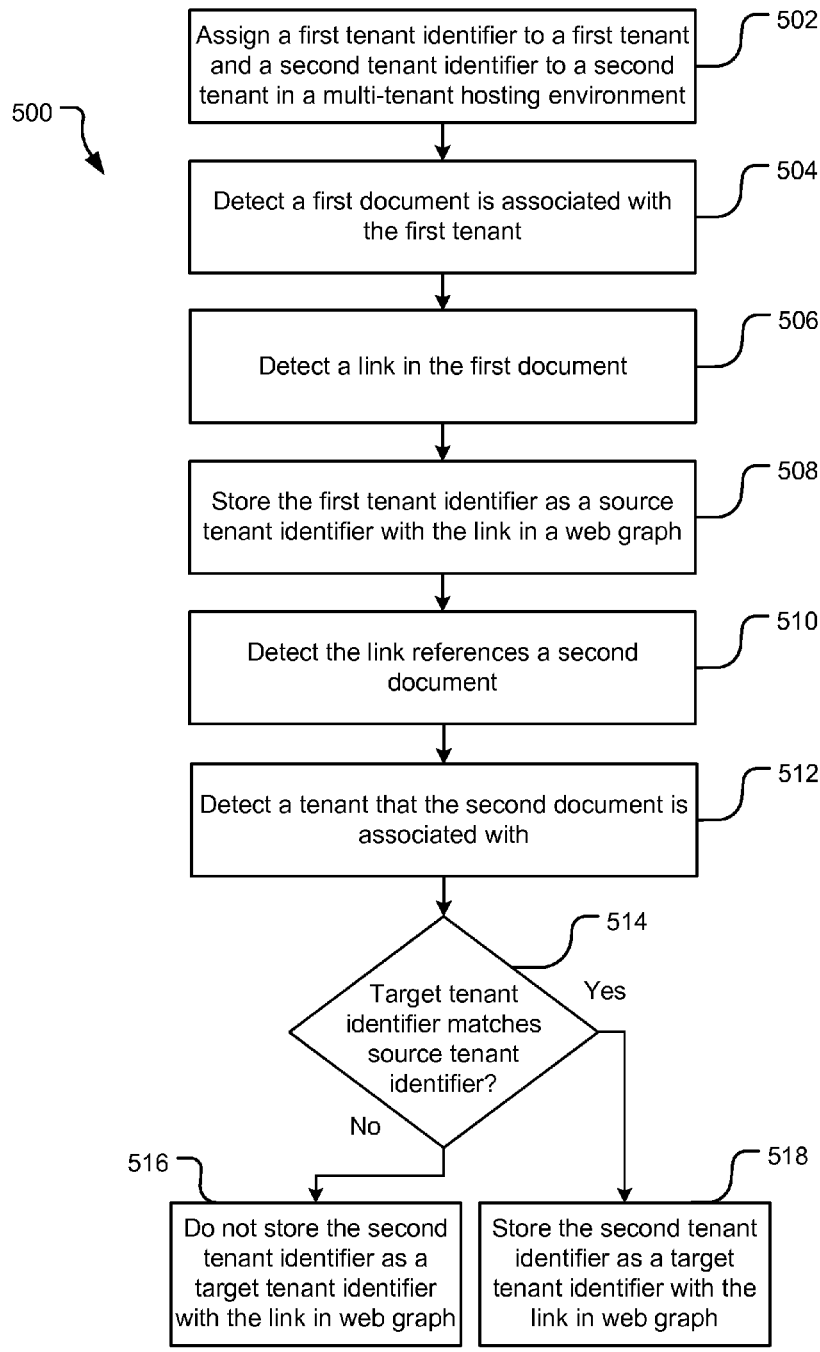
FIG. 5 is a flow diagram representing an embodiment of a method for tenantizing links in a web graph.

FIG. 5 is a flow diagram representing an embodiment of a method for tenantizing links in a web graph.

According to some embodiments, some or all of the method of FIG. 5 may be implemented on a computer system, e.g., computer system 200. Further, some or all of the method of FIG. 5 may be performed within a multi-tenant hosting environment, e.g., hosting environment 106. Further still, some or all of the method of FIG. 5 may be performed in conjunction with or in addition to the methods of FIGS. 3A, 3B, and 4.

The method of FIG. 5 begins with assign operation 502. At assign operation 502, a first tenant identifier ($TID_1$) is assigned to a first tenant and a second tenant identifier ($TID_2$) is assigned to a second tenant in a multi-tenant hosting environment. For example, a computer system on the multi-tenant hosting environment may assign the first tenant identifier ($TID_1$) to the first tenant and the second tenant identifier ($TID_2$) to the second tenant via any suitable means. Alternatively, the first tenant may assign the $TID_1$ and may provide the $TID_1$ to the computer system on the multi-tenant hosting environment; and the second tenant may assign the $TID_2$ and may provide the $TID_2$ to the computer system on the multi-tenant hosting environment. The first tenant identifier and the second tenant identifier may be any suitable identifier, e.g., a unique numeric constant used to denote the first tenant and a unique numeric constant used to denote the second tenant.

At detect operation 504, a first document of a plurality of documents associated with the first tenant is detected. For example, a computer system associated with a multi-tenant hosting environment may detect that the first document is associated with the first tenant via any suitable means. For example, the computer system may detect that the first document is associated with the first tenant by querying databases of document collections stored on the multi-tenant hosting environment. According to alternative embodiments, the computer system may detect that the first document is associated with the first tenant by accessing metadata in the first document. According to still alternative embodiments, the computer system may detect that the first document is associated with the first tenant by accessing the first document in a database of the first tenant.

At detect link operation 506, a link is detected in the first document. The link may be detected via any suitable means, e.g., by a document crawler. For example, the document crawler may detect the link by parsing the document. According to embodiments, links may be embedded in the document, e.g., as html tags or other types of links. According to embodiments, the computer system associated with a multi-tenant hosting environment detects the link in the first document when the first document is stored in a database on the hosting environment. According to alternative embodiments, the computer system detects the link in the first document by accessing the first document in a database of the first tenant.

At store operation 508, the first tenant identifier ($TID_1$) is stored as a source tenant identifier ($sTID_1$) with the link in a web graph on the multi-tenant hosting environment. For example, a document crawler may build a web graph in which nodes correspond to each document and edges correspond to the links between them. The document crawler may be associated with a computer system of the multi-tenant hosting environment and may store the first tenant identifier with the link via any suitable means. For example, the link may be associated with $sTID_1$ and may be stored in the web graph of cross-document linking information on the multi-tenant hosting environment, e.g., web graph 132.

At detect reference operation 510, it is detected that the link references a second document. The reference to the second document may be detected via any suitable means. For example, a document crawler associated with the multi-tenant hosting environment may detect a pointer to the second document in the link. According to embodiments, the first document may include metadata or other information regarding the second document (e.g., anchor text). According to embodiments, anchor text in a source document may be used for calculating predicted relevance of a target document.

At detect operation 512, a computer system detects a tenant that the second document is associated with. For example, the computer system associated with a multi-tenant hosting environment may detect that the second document is associated with the first tenant by querying databases of document collections stored on the multi-tenant hosting environment. Alternatively, the computer system associated with a multi-tenant hosting environment may detect that the second document is associated with the second tenant by querying databases of document collections stored on the multi-tenant hosting environment. According to alternative embodiments, the computer system may detect that the second document is associated with the first tenant or with the second tenant by accessing metadata in the second document. If it is detected that the second document is associated with the first tenant, a target tenant identifier associated with the second document will be the first tenant identifier ($tTID_1$). If it is detected that the second document is associated with the second tenant, a target tenant identifier associated with the second document will be the second tenant identifier ($tTID_2$).

At determination operation 514, the document crawler determines whether the target tenant identifier matches the source tenant identifier. If the target tenant identifier associated with the second document is the first tenant identifier ($tTID_1$), the target tenant identifier matches the source tenant identifier and the method proceeds to store operation 518. If the target tenant identifier associated with the second document is the second tenant identifier ($tTID_1$), the target tenant identifier does not matches the source tenant identifier and the method proceeds to do not store operation 516.

At do not store operation 516, the document crawler does not store the link in a web graph on the multi-tenant hosting environment. As such, the link may not be resolved. In this case, anchor text in the source document may not be used for calculating a predicted relevance for the target document.

At store operation 518, the link is stored in a web graph on the multi-tenant hosting environment. For example, a document crawler may build the web graph in which nodes correspond to each document and edges correspond to the links between them. The document crawler may be associated with a computer system of the multi-tenant hosting environment and may store the link via any suitable means. For example, the link may be stored in web graph 132. In this case, the link may be resolved and anchor text in the source document may be used for calculating a predicted relevance for the target document.

As should be appreciated, the particular steps and methods described herein are not exclusive and, as will be understood by those skilled in the art, the particular ordering of steps as described herein is not intended to limit the method, e.g., steps may be performed in differing order, additional steps may be performed, and disclosed steps may be excluded without departing from the spirit of the present disclosure.

Figure 6A:
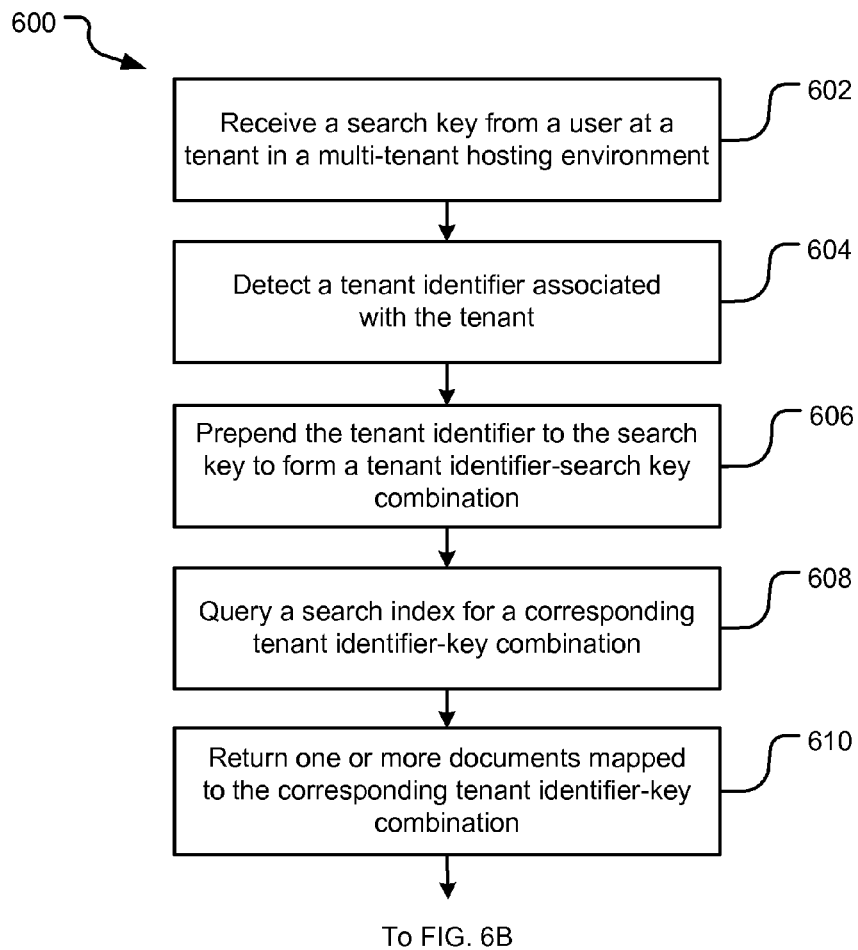
FIGS. 6A and 6B are flow diagrams representing an embodiment of a method for searching documents in a multi-tenant hosting environment.
Figure 6B:
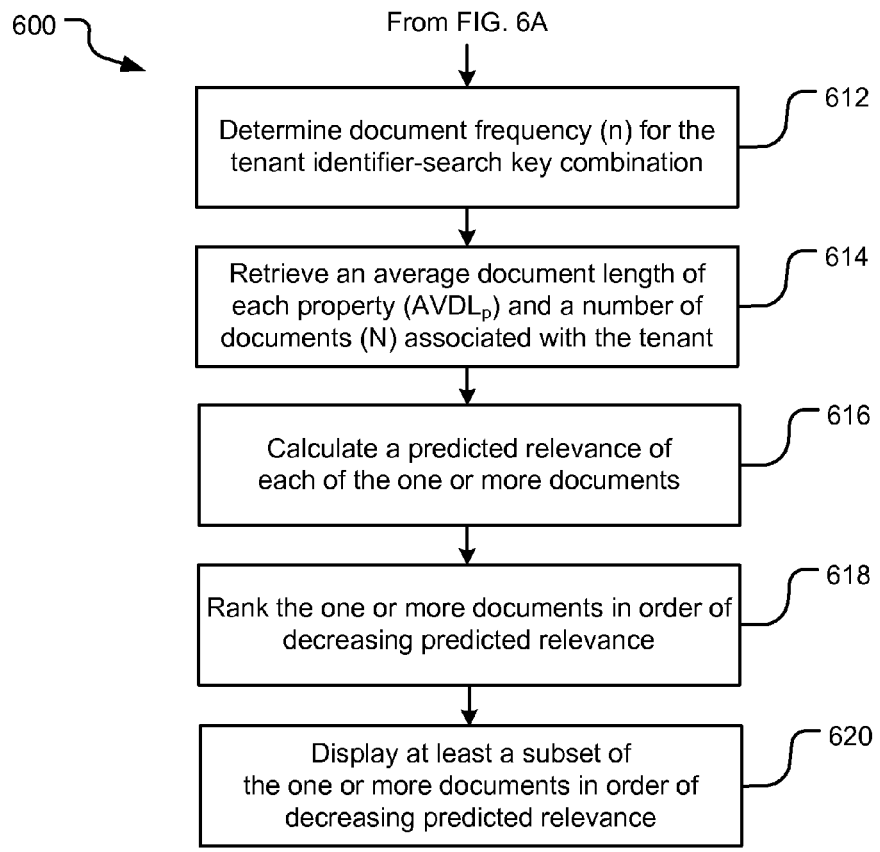

FIGS. 6A and 6B are flow diagrams representing an embodiment of a method for searching documents in a multi-tenant hosting environment.

According to some embodiments, some or all of the method of FIGS. 6A and 6B may be implemented on a computer system, e.g., computer system 200. Further, some or all of the method of FIGS. 6A and 6B may be performed within a multi-tenant hosting environment, e.g., hosting environment 106. Further still, some or all of the method of FIGS. 6A and 6B may be performed in conjunction with or in addition to the methods of FIGS. 3A, 3B, 4, and 5.

The method 600 of FIG. 6A begins with receive operation 602. At receive operation 602, one or more search keys are received from a tenant in a multi-tenant hosting environment. A search key may be anything that is searchable within a document, e.g., a word, phrase, number, symbol, etc. For example, the one or more search keys may be received as input from a user, e.g., via user interface 110 on the first tenant 102 or user interface 112 on second tenant 104. According to embodiments, the one or more search keys specify documents that may be relevant to the user.

At detect tenant operation 604, a tenant identifier associated with the tenant is detected. For example, a computer system associated with a multi-tenant hosting environment may detect that the one or more search keys are received via user interface 110. In this case, the computer system may detect a first tenant identifier ($TID_1$) associated with the first tenant 102 based on site context. Alternatively, the computer system associated with the multi-tenant hosting environment may detect that the one or more search keys are received via user interface 112. In this case, the computer system may detect a second tenant identifier ($TID_2$) associated with the second tenant 104 based on site context. Alternatively still, the first tenant identifier ($TID_1$) associated with tenant 102 may be provided with the one or more search keys at receive operation 602, or the second tenant identifier ($TID_2$) associated with tenant 104 may be provided with the one or more search keys at receive operation 602.

At prepend operation 606, the tenant identifier is prepended to each of the one or more search keys. For example, if the computer system associated with the multi-tenant hosting environment detected the first tenant identifier, the first tenant identifier ($TID_1$) may be added prior to each of the one or more search keys ($SK_n$) to form one or more first tenant identifier-search key combinations, e.g., $TID_1$-$SK_n$. Alternatively, if the computer system associated with the multi-tenant hosting environment detected the second tenant identifier, the second tenant identifier ($TID_2$) may be added prior to each of the one or more search keys ($SK_n$) to form one or more second tenant identifier-search key combinations, e.g., $TID_2\text{-}SK_n$. Alternatively still, the first tenant identifier ($TID_1$) may be prepended to the one or more search keys by tenant 102 and the first tenant identifier-search key combinations, e.g., $TID_1\text{-}SK_n$, may be provided to the multi-tenant hosting environment at receive operation 602. Alternatively, the second tenant identifier ($TID_2$) may be prepended to the one or more search keys by tenant 104 and the second tenant identifier-search key combinations, e.g., $TID_2\text{-}SK_n$, may be provided to the multi-tenant hosting environment at receive operation 602.

At query operation 608, a search index is queried for one or more tenant identifier-key combinations ($TID\text{-}K_n$) corresponding to the one or more tenant identifier-search key combinations ($TID\text{-}SK_n$). For example, a search engine associated with the multi-tenant hosting environment may query the search index (e.g., search index 122) for a TID-K that matches each TID-SK. As specified above, the search index may include a plurality of keys mapped to each property of the plurality of documents associated with the first tenant, e.g., $TID_1\text{-}K_n$, and a plurality of keys mapped to each property of the plurality of documents associated with the second tenant, e.g., $TID_2\text{-}K_n$. Thus, for one or more $TID_1\text{-}SK_n$, the search engine associated with the multi-tenant hosting environment may query the search index for one or more $TID_1\text{-}K_n$. Alternatively, for one or more $TID_2\text{-}SK_n$, the search engine associated with the multi-tenant hosting environment may query the search index for one or more $TID_2\text{-}K_n$.

At return operation 610, one or more documents mapped to one or more tenant identifier-key combinations ($TID\text{-}K_n$) are returned that match the one or more tenant identifier-search key combinations ($TID\text{-}SK_n$). That is, the key combinations and search key combinations will have the same prepended tenant identifier. For example, upon receiving a search key "airplane" from user interface 110, a search engine (e.g., search engine 124) may prepend a first tenant identifier to the search key to form a first tenant identifier-search key combination, e.g., $TID_1\text{-}SK_{airplane}$. The search engine may return one or more documents mapped to a corresponding first tenant identifier-key combination, e.g., $TID_1\text{-}K_{airplane}$, in the search index. According to further embodiments, the search engine may identify one or more properties of the one or more documents returned that are mapped to the corresponding first tenant identifier-key combination, e.g., $TID_1\text{-}K_{airplane}$, in the search index. As such, the query returns only documents associated with the tenant queried (based on the tenant identifier). As such, documents of other tenants do not need to be filtered out of the returned documents, saving considerable processing load.

The method 600 of FIG. 6B, which is a continuation of the method 600 of FIG. 6A, begins with determine operation 612. At determine operation 612, the search engine may determine a document frequency (n) of each of the one or more tenant identifier-key combinations ($TID\text{-}K_n$). For example, the search engine may determine a document frequency, n, for the first tenant identifier-key combination associated with the "airplane" key, i.e., for $TID_1\text{-}K_{airplane}$. This determination may be based on the length of a postings list in the inverted index associated with $TID_1\text{-}K_{airplane}$. According to some embodiments, determination of the document frequency for $TID_1\text{-}K_{airplane}$ may comprise retrieving the document frequency from the search index or from some other data storage. According to embodiments, determination of the document frequency does not require any additional computation to filter out statistics for other tenants in the multi-tenant hosting environment.

At retrieve operation 614, an average document length of each property ($AVDL_p$) of the one or more identified properties associated with the tenant and a total document count (N) associated with the tenant are retrieved. As described above, an $AVDL_p$ for each property associated with the tenant and an N for each tenant of a multi-tenant hosting environment may be stored in a dictionary or other database on the multi-tenant hosting environment. For example, an $AVD_1L_p$ for each property associated with a first tenant and an $N_1$ associated with the first tenant may be stored in a first dictionary 128 in the multi-tenant hosting environment. Moreover, an $AVD_2L_p$ for each property associated with a second tenant and an $N_2$ associated with the second tenant may be stored in a second dictionary 130 on the multi-tenant hosting environment. According to some embodiments, the $AVD_1L_p$ for each property and the $N_1$ associated with the first tenant and the $AVD_2L_p$ for each property and the $N_2$ associated with the second tenant may be stored in the same dictionary on the multi-tenant hosting environment.

At calculate operation 616, a predicted relevance of each document of the one or more documents returned for the tenant is calculated via any suitable means. For example, a search engine (e.g., search engine 124) may execute a ranking function that evaluates the quality of match between the search and each document of the one or more documents may be used, e.g., a ranking function referred to as BM25F. BM25F may be used to calculate a predicted relevance of each document of the one or more documents by accounting for each occurrence of each search key as it appears in each property associated with each document being scored. Each property has its own weight and associated values (such as length and term frequency, tf) that are used to generate a property-specific score for that occurrence. All property scores may be combined for each search key and these search key scores may be combined across the one or more search keys in the query to provide an overall score for each document.

The BM25F ranking function is as follows:

$$BM25F = \sum \frac{tf'(k_1+1)}{k_1+tf'} \cdot \log\left(\frac{N}{n_t}\right)$$

$$tf'_t = \sum_{p \in D} tf_{t,p} \cdot w_p \cdot \frac{1}{(1-b)+b\left(\frac{DL_p}{AVDL_p}\right)}$$

where t is a search key; p is a property of the document; N is the total document count for the tenant; $n_t$ is the number of documents containing search key t; $DL_p$ is the length of the property p; $AVDL_p$ is the average document length of the property p; $tf_p$ is the search key t frequency in the property p; $w_p$ is the weight for the property p; b is the length normalization for the property p; and $k_1$ is the curvature (a tunable constant).

In the BM25F formula, each property, p, of a document may contain one or more search keys. In an embodiment, properties include a body property, title property, author property, anchor text property, URL display name property, metadata property, extracted title property, etc. It should be noted that some of the properties (i.e., body) are part of the document itself, while other properties may be metadata directly associated with the document and still other properties (e.g., anchor text associated with a link in the document)

may be metadata which is indirectly associated with the document because it is stored with a different document.

With respect to a multi-tenant hosting environment, each document of the one or more documents returned in the query may be ranked using the BM25F ranking function. However, in this case, each document may be ranked based on parameters associated with a particular tenant. For example, for each of the one or more documents returned for a first tenant, the parameters of the BM25F ranking function may include: t is a search key; p is a property of a document associated with the first tenant; $N_1$ is the total document count for the first tenant; $n_t$ is the number of documents associated with the first tenant containing the search key t; $D_1L_p$ is the length of the property p associated with the document; $AVD_1L_p$ is the average document length of the property p for the first tenant; $tf_{t,p}$ is the search key t frequency in the property p associated with the document; $w_p$ is the weight for the property p; b is the length normalization for the property p; and $k_1$ is the curvature. Utilizing the BM25F ranking function, a term score for each of the one or more properties in each document, among other features, may be combined to provide an overall score for each document of the one or more documents returned for the first tenant. According to embodiments, the overall score is associated with a predicted relevance for each of the one or more documents returned for the first tenant.

Alternatively, for each of the one or more documents returned for a second tenant, the parameters of the BM25F ranking function may include: t is a search key; p is a property of a document associated with the second tenant; $N_2$ is the total document count for the second tenant; $n_t$ is the number of documents associated with the second tenant containing the search key t; $D_2L_p$ is the length of the property p associated with the document; $AVD_2L_p$ is the average document length of the property p for the second tenant; $tf_{t,p}$ is the search key t frequency in the property p associated with the document; $w_p$ is the weight for the property p; b is the length normalization for the property p; and $k_1$ is the curvature. Utilizing the BM25F ranking function, an overall score may be calculated for each of the one or more documents returned for the second tenant. Utilizing the BM25F ranking function, a term score for each of the one or more properties in each document, among other features, may be combined to provide an overall score for each document of the one or more documents returned for the second tenant. According to embodiments, the overall score is associated with a predicted relevance for each of the one or more documents returned for the second tenant.

At rank operation 618, each document of the one or more documents returned for the tenant is ranked in order of decreasing predicted relevance. For example, each document may be ranked based on the overall score resulting from the BM25F ranking function. That is, the overall score associated with each document may be used to arrange the one or more documents in order of decreasing predicted relevance. As such, for one or more documents returned for the first tenant, each document may be ranked in order of decreasing predicted relevance with respect to the first tenant. Alternatively, for one or more documents returned for the second tenant, each document may be ranked in order of decreasing predicted relevance with respect to the second tenant.

At display operation 620, at least a subset of the one or more documents is displayed in order of decreasing predicted relevance. As noted above, upon conducting a query, documents may be displayed in one or more subsets, e.g., of 10 or 20 documents at a time. Based on ranking the one or more documents, documents may be displayed such that documents which are more likely to be relevant may be presented first. That is, according to embodiments, at least a subset of the one or more documents that are most likely to be relevant may be displayed. According to alternative embodiments, all of the one or more documents may be available for display upon selection of each of the one or more subsets.

As should be appreciated, the particular steps and methods described herein are not exclusive and, as will be understood by those skilled in the art, the particular ordering of steps as described herein is not intended to limit the method, e.g., steps may be performed in differing order, additional steps may be performed, and disclosed steps may be excluded without departing from the spirit of the present disclosure.

Figure 7A:
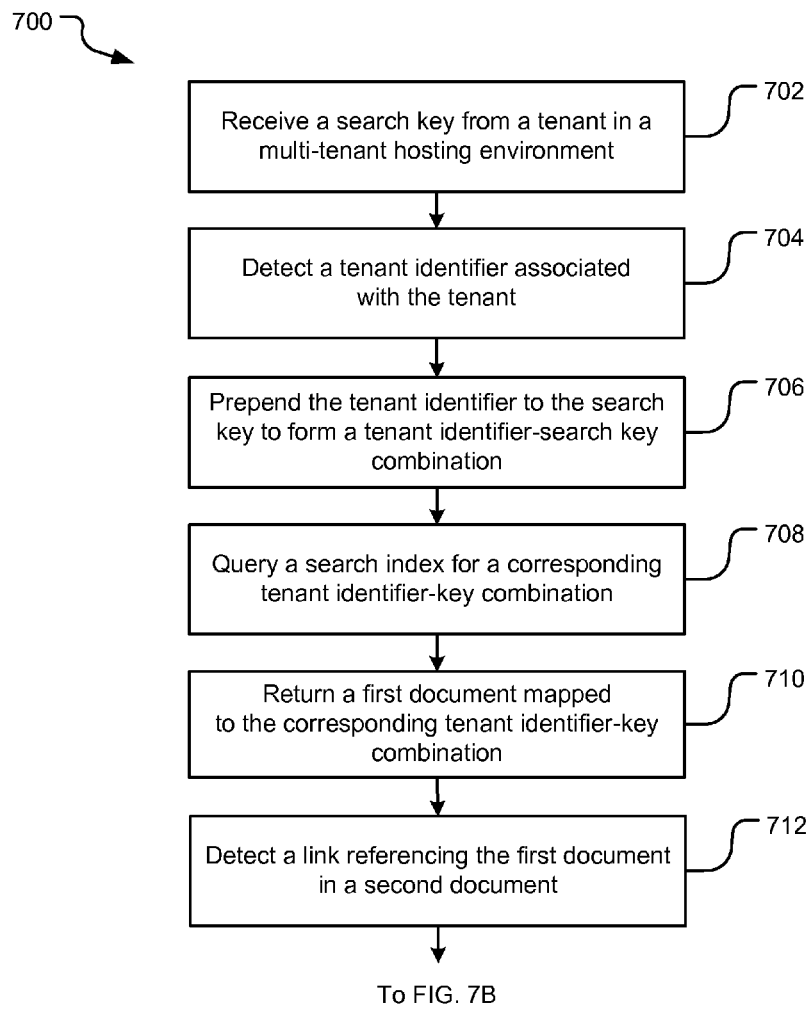
FIGS. 7A and 7B are flow diagrams representing an embodiment of a method for resolving a link when searching documents in a multi-tenant hosting environment.
Figure 7B:
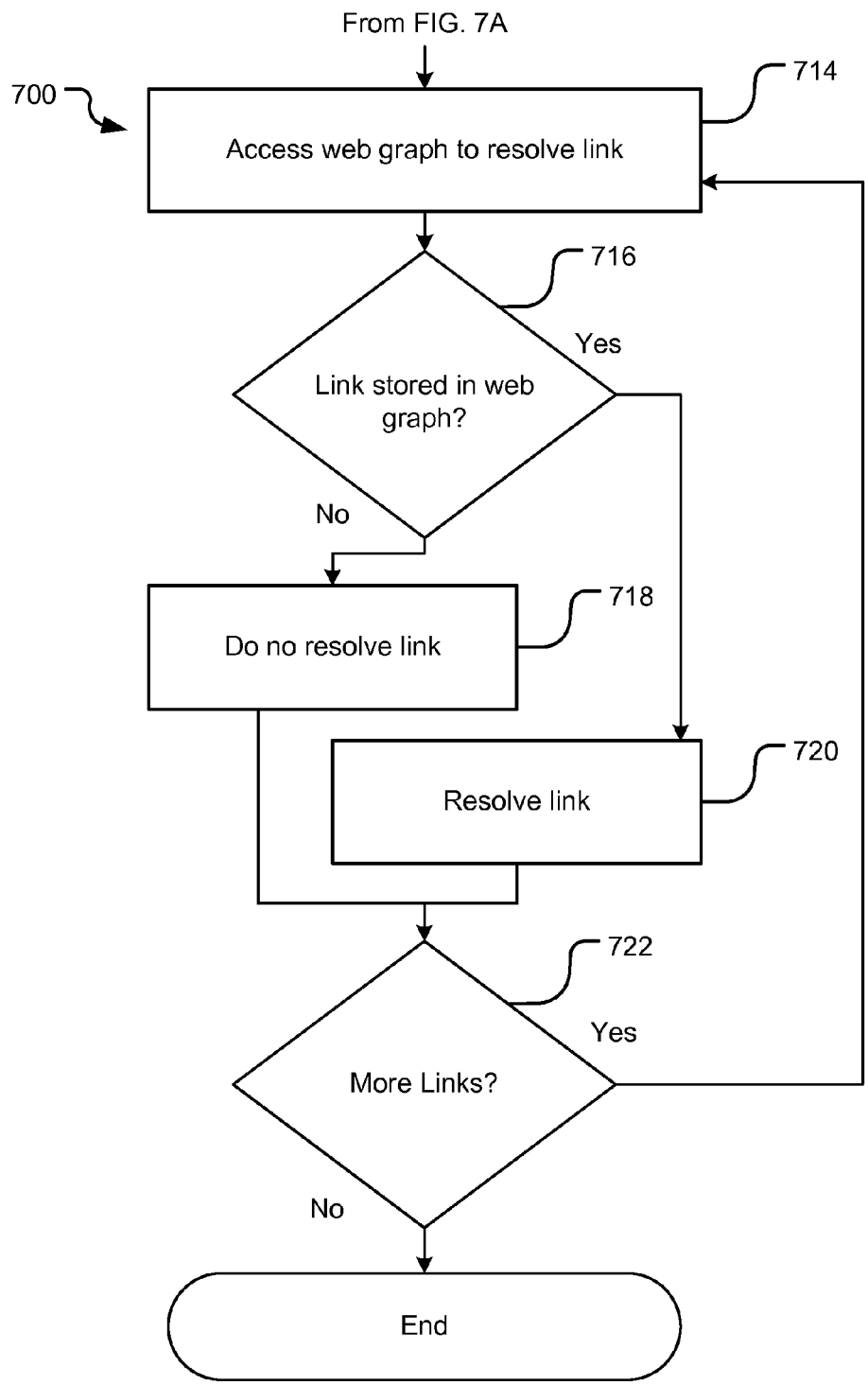

FIGS. 7A and 7B are flow diagrams representing an embodiment of a method for resolving a link when searching documents in a multi-tenant hosting environment.

According to some embodiments, some or all of the method 700 of FIGS. 7A and 7B may be preferably implemented on a computer system, e.g., computer system 200. Further, some or all of the method 700 of FIGS. 7A and 7B may be performed within a multi-tenant hosting environment, e.g., hosting environment 106. Further still, some or all of the method 700 of FIGS. 7A and 7B may be performed in conjunction with or in addition to the methods of FIGS. 3A, 3B, 4, 5, 6A and 6B.

The method 700 of FIG. 7A begins with receive operation 702. At receive operation 702, as with receive operation 602, one or more search keys are received from a tenant in a multi-tenant hosting environment. For example, the one or more search keys may be received as input from a user, e.g., via user interface 110 on the first tenant 102 or user interface 112 on second tenant 104. According to embodiments, the one or more search keys specify documents that may be relevant to the user.

At detect tenant operation 704, as with detect tenant operation 604, a tenant identifier associated with the tenant is detected. For example, a computer system associated with a multi-tenant hosting environment may detect that the one or more search keys are received via user interface 110. In this case, the computer system may detect a first tenant identifier ($TID_1$) associated with the first tenant 102 based on site context. Alternatively, the computer system associated with the multi-tenant hosting environment may detect that the one or more search keys are received via user interface 112. In this case, the computer system may detect a second tenant identifier ($TID_2$) associated with the second tenant 104 based on site context. Alternatively still, the first tenant identifier ($TID_1$) associated with tenant 102 may be provided with the one or more search keys at receive operation 702, or the second tenant identifier ($TID_2$) associated with tenant 104 may be provided with the one or more search keys at receive operation 702.

At prepend operation 706, as with prepend operation 606, the tenant identifier is prepended to each of the one or more search keys. For example, if the computer system associated with the multi-tenant hosting environment detected the first tenant identifier, the first tenant identifier ($TID_1$) may be added prior to each of the one or more search keys ($SK_n$) to form one or more first tenant identifier-search key combinations, e.g., $TID_1$-$SK_n$. Alternatively, if the computer system associated with the multi-tenant hosting environment detected the second tenant identifier, the second tenant identifier ($TID_2$) may be added prior to each of the one or more search keys ($SK_n$) to form one or more second tenant identifier-search key combinations, e.g., $TID_2$-$SK_n$. Alternatively still, the first tenant identifier ($TID_1$) may be prepended to the one or more search keys by tenant 102 and the first tenant identifier-search key combinations, e.g., $TID_1$-$SK_n$, may be provided to the multi-tenant hosting environment at receive operation 702. Alternatively, the second tenant identifier ($TID_2$) may be prepended to the one or more search keys by tenant 104 and the second tenant identifier-search key combinations, e.g., $TID_2$-$SK_n$, may be provided to the multi-tenant hosting environment at receive operation 702.

At query operation 708, as with query operation 608, a search index is queried for one or more tenant identifier-key combinations ($TID$-$K_n$) corresponding to the one or more tenant identifier-search key combinations ($TID$-$SK_n$). That is, a search engine associated with the multi-tenant hosting environment may query the search index (e.g., search index 122) for a $TID$-$K$ that matches each $TID$-$SK$. As specified above, the search index may include a plurality of keys mapped to each property of the plurality of documents associated with the first tenant, e.g., $TID_1$-$K_n$, and a plurality of keys mapped to each property of the plurality of documents associated with the second tenant, e.g., $TID_2$-$K_n$. Thus, for one or more $TID_1$-$SK_n$, the search engine associated with the multi-tenant hosting environment may query the search index for one or more $TID_1$-$K_n$. Alternatively, for one or more $TID_2$-$SK_n$, the search engine associated with the multi-tenant hosting environment may query the search index for one or more $TID_2$-$K_n$.

At return operation 710, as with return operation 610, one or more documents mapped to one or more tenant identifier-key combinations ($TID$-$K_n$) are returned that match the one or more tenant identifier-search key combinations ($TID$-$SK_n$). For example, upon receiving a search key "airplane" from user interface 110, a search engine (e.g., search engine 124) may prepend a first tenant identifier to the search key to form a first tenant identifier-search key combination, e.g., $TID_1$-$SK_{airplane}$. The search engine may return one or more documents mapped to a corresponding first tenant identifier-key combination, e.g., $TID_1$-$K_{airplane}$, in the search index. According to further embodiments, the search engine may identify one or more properties of the one or more documents returned that are mapped to the corresponding first tenant identifier-key combination, e.g., $TID_1$-$K_{airplane}$, in the search index.

At detect link operation 712, a link is detected in a second document that references the first document. The link may be detected via any suitable means, e.g., by a document crawler. According to embodiments, a document crawler associated with a multi-tenant hosting environment may detect the link in the second document upon parsing the second document. According to embodiments, the link may be embedded in the second document, e.g., as an html tag or other type of link, and the link may reference the first document. The second document may be associated with a source tenant identifier on the multi-tenant hosting environment.

The method 700 of FIG. 7B, which is a continuation of the method 700 of FIG. 7A, begins with access web graph operation 714. For example, a computer on the multi-tenant hosting environment may access web graph 132. Web graph 132 may be built such that nodes correspond to documents and edges correspond to the links between them. Moreover, a link may be stored in web graph 132 only if a target tenant identifier for the first document matches the source tenant identifier for the second document. For example, there is a match if the target tenant identifier is the first tenant identifier ($tTID_1$) and the source tenant identifier is the first tenant identifier ($sTID_1$). Additionally, there is a match if the target tenant identifier is the second tenant identifier ($tTID_2$) and the source tenant identifier is the second tenant identifier ($sTID_2$). In the case of a match, the link will be included in web graph 132. On the other hand, there is not a match if the target tenant identifier is the first tenant identifier ($tTID_1$) and the source tenant identifier is the second tenant identifier ($sTID_2$). Additionally, there is not a match if the target tenant identifier is the second tenant identifier ($tTID_2$) and the source tenant identifier is the first tenant identifier ($sTID_1$). In the case of no match, the link will not be included in web graph 132.

At determination operation 716, it is determined whether the link is stored in a web graph. If the link is stored in the web graph, the method 700 proceeds to resolve operation 720. On the other hand, if the link is not stored in the web graph, the method 700 proceeds to do not resolve operation 718.

At do not resolve operation 718, the link in the first document is not resolved. That is, if the target tenant identifier does not match the source tenant identifier for the link, a web graph associated with the first document does not include the link. As such, the link may not be resolved for purposes of calculating a predicted relevance for the first document (i.e., the target document). As mentioned above, different properties associated with a document may influence the calculation of a predicted relevancy of the document. For example, an anchor text property may have an impact on the predicted relevancy calculation, e.g., affecting link analyses such as page rank or click distance computation. In order to prevent documents of one tenant from influencing the predicted relevancy calculation for documents of another tenant, links are resolved only if the source tenant for a document is the same as the target tenant for a linked document. Ensuring that the source tenant identifier for a link matches the target tenant identifier accomplishes this objective. As such, the edges of the web graph between documents with different tenant identifiers are removed so that one tenant can't affect another tenant's static rank. Thus, one tenant is effectively prevented from spamming another tenant within a multi-tenant hosting environment—even if documents for both tenants are mapped to the same search index or the same web graph. When the link is not resolved, the method 700 proceeds to decision operation 722.

At resolve operation 720, the link in the first document is resolved. That is, if the target tenant identifier matches the source tenant identifier for the link, a web graph associated with the first document includes the link. As such, the link may be resolved for purposes of calculating a predicted relevance for the first document. Upon resolving the link, the method 700 proceeds to decision operation 722.

At decision operation 722, it is determined whether an additional link references the first document. The additional link may be detected via any suitable means, e.g., by a search engine or document crawler. According to embodiments, a search engine or document crawler associated with a multi-tenant hosting environment may detect the additional link in any document stored on the multi-tenant hosting environment. If the additional link has a source tenant identifier associated with the first tenant, the source tenant identifier of the link is the first tenant identifier ($sTID_1$). If the additional link has a source tenant identifier associated with the second tenant, the source tenant identifier of the link is the second tenant identifier ($sTID_2$). If an additional link is detected, the method 700 returns to access web graph operation 714. If the first document does not have an additional link, the method 700 may end.

As should be appreciated, the particular steps and methods described herein are not exclusive and, as will be understood by those skilled in the art, the particular ordering of steps as described herein is not intended to limit the method, e.g., steps may be performed in differing order, additional steps may be performed, and disclosed steps may be excluded without departing from the spirit of the present disclosure.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternative embodiments having fewer than or more than all of the features herein described are possible. In addition, any use of the terms "first" or "second" are intended to distinguish between elements, but do not imply any particular order.

While various embodiments have been described for purposes of this disclosure, various changes and modifications may be made which are well within the scope of the present disclosure. Numerous other changes may be made which will readily suggest themselves to those skilled in the art and which are encompassed in the spirit of the disclosure and as defined in the appended claims.

What is claimed is:

1. A computer storage device storing computer-executable instructions for implementing a method of indexing a first document in a multi-tenant hosting environment, the method comprising:
    indexing a first property of a first document in a search index, comprising:
        identifying a first plurality of keys in the first property of the first document;
        prepending a first tenant identifier to each key of the first plurality of keys to form a first plurality of first tenant identifier-key combinations;
        storing the first plurality of first tenant identifier-key combinations in a search index; and
        mapping the first property of the first document to each of the first plurality of first tenant identifier-key combinations in the search index;
    indexing a second property of the first document in the search index, comprising:
        identifying a second plurality of keys in the second property of the first document, wherein the second plurality of keys has one or more keys in common with the first plurality of keys;
        prepending the first tenant identifier to each key of the second plurality of keys to form a second plurality of first tenant identifier-key combinations, wherein the second plurality of first tenant identifier-key combinations has one or more first tenant identifier-key combinations in common with the first plurality of first tenant identifier-key combinations; and
        mapping the second property of the first document to each of the second plurality of first tenant identifier-key combinations in the search index.

2. The computer storage device of claim 1, further comprising:
    identifying a length of the first property of the first document; and
    storing the length of the first property.

3. The computer storage device of claim 2, further comprising:
    retrieving the length of the first property in each document of a plurality of documents associated with a first tenant of the multi-tenant hosting environment;
    calculating an average document length for the first property associated with the first tenant; and
    storing the average document length for the first property associated with the first tenant.

4. The computer storage device of claim 1, further comprising:
    determining a document frequency for each first tenant identifier-key combination; and
    storing the document frequency for each first tenant identifier-key combination.

5. The computer storage device of claim 1, further comprising:
    detecting a link in the first document that references a second document;
    detecting a source tenant identifier associated with the first document; and
    detecting a target tenant identifier associated with the second document.

6. The computer storage device of claim 5, further comprising:
    storing the link in a web graph when the target tenant identifier matches the source tenant identifier.

7. The computer storage device of claim 5, further comprising:
    not storing the link in a web graph when the target tenant identifier does not match the source tenant identifier.

8. A computer system, comprising:
    at least one processor; and
    at least one memory, communicatively coupled to the at least one processor and containing computer-readable instructions that, when executed by the at least one processor, perform a method of indexing a first document in a multi-tenant hosting environment, the method comprising:
        indexing a first property of a first document in a search index, comprising:
            identifying a first plurality of keys in the first property of the first document;
            prepending a first tenant identifier to each key of the first plurality of keys to form a first plurality of first tenant identifier-key combinations;
            storing the first plurality of first tenant identifier-key combinations in a search index; and
            mapping the first property of the first document to each of the first plurality of first tenant identifier-key combinations in the search index;
        indexing a second property of the first document in the search index, comprising:
            identifying a second plurality of keys in the second property of the first document, wherein the second plurality of keys has one or more keys in common with the first plurality of keys;
            prepending the first tenant identifier to each key of the second plurality of keys to form a second plurality of first tenant identifier-key combinations, wherein the second plurality of first tenant identifier-key combinations has one or more first tenant identifier-key combinations in common with the first plurality of first tenant identifier-key combinations; and
            mapping the second property of the first document to each of the second plurality of first tenant identifier-key combinations in the search index.

9. The computer system of claim 8, further comprising:
    identifying a length of the first property of the first document; and
    storing the length of the first property.

10. The computer system of claim 9, further comprising:
retrieving the length of the first property in each document of a plurality of documents associated with a first tenant of the multi-tenant hosting environment;
calculating an average document length for the first property associated with the first tenant; and
storing the average document length for the first property associated with the first tenant.

11. The computer system of claim 8, further comprising:
determining a document frequency for each first tenant identifier-key combination; and
storing the document frequency for each first tenant identifier-key combination.

12. The computer system of claim 8, further comprising:
detecting a link in the first document that references a second document;
detecting a source tenant identifier associated with the first document; and
detecting a target tenant identifier associated with the second document.

13. The computer system of claim 12, further comprising:
storing the link in a web graph when the target tenant identifier matches the source tenant identifier.

14. The computer system of claim 12, further comprising:
not storing the link in a web graph when the target tenant identifier does not match the source tenant identifier.

15. A computer-implemented method of indexing a first document in a multi-tenant hosting environment, comprising:
indexing a first property of a first document in a search index, comprising:
identifying a first plurality of keys in the first property of the first document;
prepending a first tenant identifier to each key of the first plurality of keys to form a first plurality of first tenant identifier-key combinations;
storing the first plurality of first tenant identifier-key combinations in a search index; and
mapping the first property of the first document to each of the first plurality of first tenant identifier-key combinations in the search index;
indexing a second property of the first document in the search index, comprising:
identifying a second plurality of keys in the second property of the first document, wherein the second plurality of keys has one or more keys in common with the first plurality of keys;
prepending the first tenant identifier to each key of the second plurality of keys to form a second plurality of first tenant identifier-key combinations, wherein the second plurality of first tenant identifier-key combinations has one or more first tenant identifier-key combinations in common with the first plurality of first tenant identifier-key combinations; and
mapping the second property of the first document to each of the second plurality of first tenant identifier-key combinations in the search index.

16. The computer-implemented method of claim 15, further comprising:
retrieving a length of a first property in each document of a plurality of documents associated with a first tenant of the multi-tenant hosting environment;
calculating an average document length for the first property associated with the first tenant; and
storing the average document length for the first property associated with the first tenant.

17. The computer-implemented method of claim 15, further comprising:
determining a document frequency for each first tenant identifier-key combination; and
storing the document frequency for each first tenant identifier-key combination.

18. The computer-implemented method of claim 15, further comprising:
detecting a link in the first document that references a second document;
detecting a source tenant identifier associated with the first document; and
detecting a target tenant identifier associated with the second document.

19. The computer-implemented method of claim 18, further comprising:
storing the link in a web graph when the target tenant identifier matches the source tenant identifier.

20. The computer-implemented method of claim 18, further comprising:
not storing the link in a web graph when the target tenant identifier does not match the source tenant identifier.

* * * * *